United States Patent
Jones et al.

(10) Patent No.: US 9,182,477 B2
(45) Date of Patent: Nov. 10, 2015

(54) VEHICLE RADAR ALIGNMENT METHOD AND SYSTEM

(71) Applicant: Honda Motor Co., Ltd., Tokyo (JP)

(72) Inventors: Timothy Roger Jones, Corona, CA (US); Terry Lee Gasparovic, Torrance, CA (US)

(73) Assignee: Honda Motor Co., Ltd., Tokyo (JP)

(*) Notice: Subject to any disclaimer, the term of this patent is extended or adjusted under 35 U.S.C. 154(b) by 369 days.

(21) Appl. No.: 13/842,822

(22) Filed: Mar. 15, 2013

(65) Prior Publication Data

US 2014/0259707 A1    Sep. 18, 2014

(51) Int. Cl.
G01B 11/27    (2006.01)
G01S 7/40    (2006.01)
G01S 13/93    (2006.01)

(52) U.S. Cl.
CPC ............. G01S 7/4026 (2013.01); G01B 11/272 (2013.01); G01S 13/931 (2013.01); *G01S 2007/403* (2013.01); *G01S 2013/9375* (2013.01)

(58) Field of Classification Search
CPC ................................. G01B 11/27; G01B 11/26
USPC .............................. 33/228, 286, 288, 600, 203
See application file for complete search history.

(56) References Cited

U.S. PATENT DOCUMENTS

| | | | |
|---|---|---|---|
| 6,087,995 A | 7/2000 | Grace et al. | |
| 6,437,731 B1* | 8/2002 | Henrio et al. | 342/165 |
| 6,583,868 B2* | 6/2003 | Hopfenmuller | 33/288 |
| 6,778,131 B2* | 8/2004 | Haney et al. | 342/174 |
| 7,121,011 B2* | 10/2006 | Murray et al. | 33/288 |
| 7,346,994 B2* | 3/2008 | Shevela | 33/288 |
| 8,244,024 B2 | 8/2012 | Dorrance et al. | |
| 8,830,119 B2* | 9/2014 | Borruso | 33/288 |
| 8,973,278 B2* | 3/2015 | Ham | 33/286 |
| 2003/0221324 A1* | 12/2003 | Myron et al. | 33/286 |
| 2004/0049930 A1* | 3/2004 | Murray | 33/288 |
| 2005/0096807 A1* | 5/2005 | Murray et al. | 701/29 |
| 2010/0186244 A1* | 7/2010 | Schwindt | 33/288 |
| 2014/0259707 A1* | 9/2014 | Jones et al. | 33/228 |

FOREIGN PATENT DOCUMENTS

| | | |
|---|---|---|
| EP | 0905526 | 3/1999 |
| EP | 2447734 | 5/2012 |

* cited by examiner

*Primary Examiner* — Yaritza Guadalupe-McCall
(74) *Attorney, Agent, or Firm* — Rankin, Hill & Clark LLP (57) ABSTRACT

A method and system for aligning a sensor of a radar unit mounted on a vehicle, including calculating at least one alignment measurement of the vehicle from a plurality of optical sensors, positioning a target at a predetermined distance forward of the radar unit and determining a position of the radar unit based on the alignment measurement and the predetermined distance of the target. The method further includes transmitting a beam extending forward from the radar unit and positioning the target and the sensor in alignment with an axis of the beam.

26 Claims, 6 Drawing Sheets

VEHICLE RADAR ALIGNMENT METHOD AND SYSTEM

BACKGROUND

Intelligent vehicle systems use sensor technology to detect objects surrounding a region of a host vehicle. For example, a collision avoidance system can include laser or radar sensors to detect possible collisions based on the movement of surrounding vehicles, objects and pedestrians. The collision avoidance system can control another vehicle system in response to the detection of an object. For example, a braking system or a steering system can be controlled to mitigate collision with the detected object. Proper performance of such intelligent vehicle systems requires precise alignment of the sensors to detect objects with a minimal error rate.

SUMMARY

According to one aspect a computer-implemented method for aligning a sensor of a radar unit mounted on a vehicle includes calculating at least one alignment measurement from a plurality of optical sensors of an alignment system. The method also includes positioning a target at a predetermined distance forward of the radar unit and determining a position of the radar unit based on the alignment measurement and the predetermined distance of the target. The method further includes transmitting a beam extending forward from the radar unit and positioning the target and the sensor in alignment with an axis of the beam.

According to another aspect, a computer-implemented method for radar alignment on a vehicle includes positioning a target and at least one optical sensor forward and parallel to a front of the vehicle and calculating a position of a radar unit mounted on the vehicle based on a distance between the target and the radar unit and at least one alignment measurement. The method also includes emitting a beam from the radar unit extending towards the target, positioning the target in alignment with an axis of the beam and aiming a sensor of the radar unit towards the target.

According to a further aspect, a computer system for aligning a sensor of a radar unit mounted on a vehicle includes a wheel alignment module configured to calculate at least one alignment measurement of the vehicle and a radar position determining module configured to determine a position of the radar unit based on the alignment measurement and a predetermined distance of a target, the target located forward of the radar unit. The computer system also includes a beam transmission module configured to transmit a beam extending forward from the radar unit and a guidance module configured to guide the placement of the target and the sensor in alignment with the axis of the beam.

DETAILED DESCRIPTION

Figure 1:
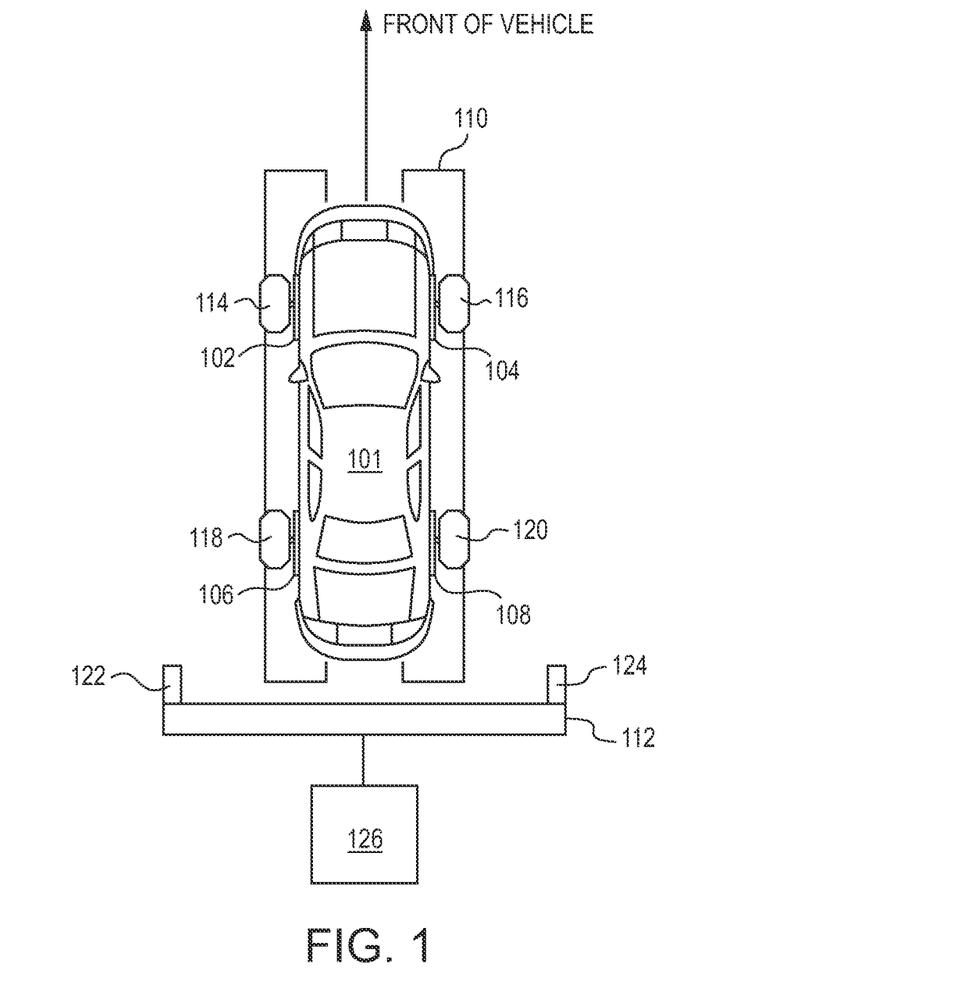
FIG. 1 is a schematic view of a radar alignment system according to an exemplary embodiment.

Referring now to the drawings, wherein the showings are for purposes of illustrating one or more exemplary embodiments and not for purposes of limiting same, FIG. 1 illustrates a radar alignment system 100 including a motor vehicle 101, with a set of front wheels 102, 104 and a set of rear wheels 106, 108. The motor vehicle 101 is positioned on a vehicle lift 110 of a vehicle service bay 112 for radar alignment. The term "motor vehicle," as used herein, refers to any moving vehicle that is capable of carrying one or more human occupants and is powered by any form of energy. The motor vehicle 101 can include one or more components typically associated with a motor vehicle, including intelligent vehicle systems utilizing sensor technology. For example, and as will be known and understood by those of skill in the art, the motor vehicle 101 can include collision avoidance systems such as a collision mitigation braking system (CMBS), a blind spot indicator system (BSI), a lane keep assist system (LKAS) among others.

The radar alignment system 100 can include components and basic functionality known in the art. For example, the radar alignment system 100 can be a visual alignment system or a three-dimensional alignment image system. Such systems can include sensors, cameras, optical targets and/or reflective mirrors to facilitate vehicle alignment. For example, in FIG. 1, the set of front wheels 102, 104 include a set of front wheel sensors 114, 116 and the set of rear wheels 106, 108 include a set of rear wheel sensors 118, 120. Additionally, a set of cameras 122, 124 on the vehicle service bay 112 can also be provided to facilitate the vehicle alignment process. It is appreciated that other configurations of sensors, cameras and optical elements and targets can be used for radar alignment according to one or more embodiments discussed herein. The radar alignment system 100 is also communicatively coupled a computer system 126, which is configured to perform radar alignment on the motor vehicle 101 as well as standard vehicle wheel alignment.

Figure 2:
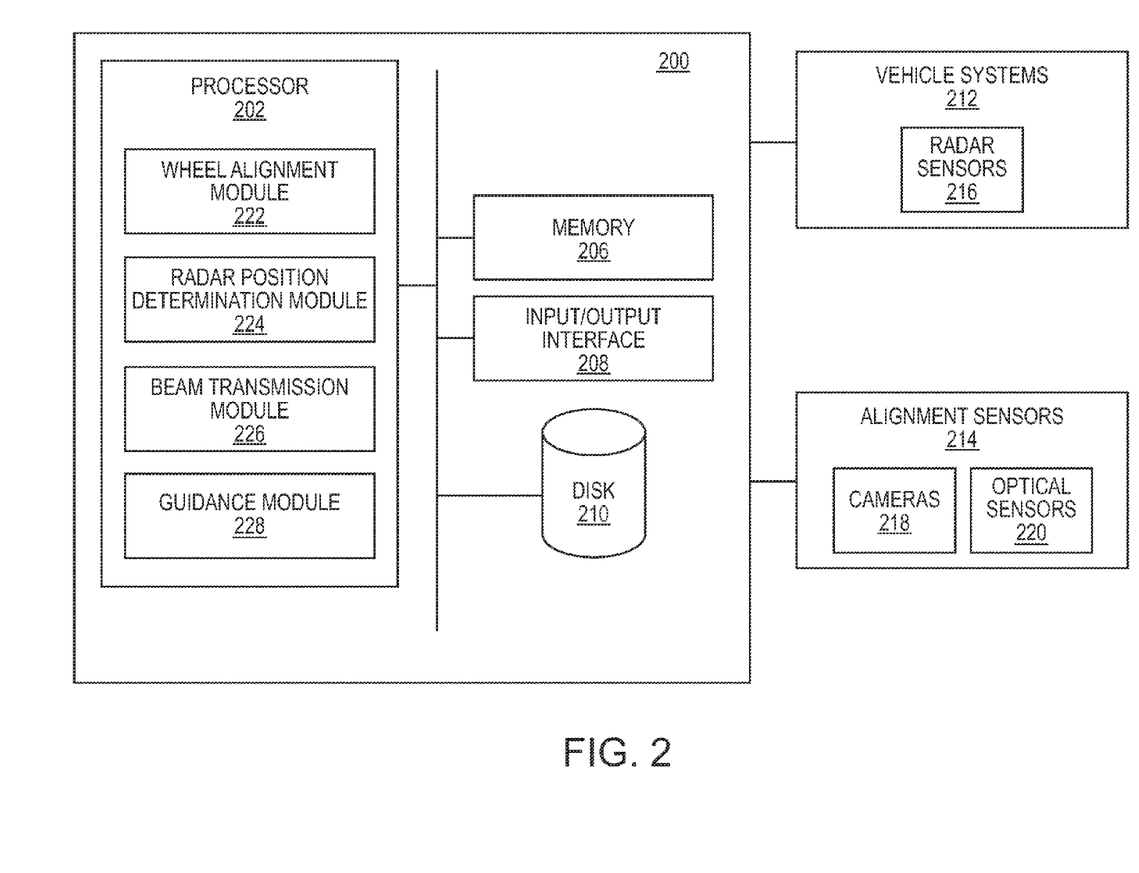
FIG. 2 is a schematic view of a computer system for aligning a sensor of a radar unit mounted on a vehicle according to an exemplary embodiment.

Referring to FIG. 2, a computer system 200 for aligning a sensor of a radar unit mounted on a vehicle according to an exemplary embodiment is illustrated. In one embodiment, the computer system 200 can be the computer system 126 of FIG. 1. As shown, the computer system 200 can include a processor 202, a memory 206, an input/output (I/O) interface 208 and a disk 210. The computer system 200 is communicatively coupled to a plurality of vehicle systems 212 and a plurality of alignment sensors 214. The plurality of vehicle system 218 can include intelligent vehicle systems, for example, a CMBS, a BSI, a LKAS, among others. The plurality of vehicle systems 212 can include one or more radar sensors 216 use to detect vehicles, objects and pedestrians surrounding the motor vehicle 101. The plurality of alignment sensors 214 can include one or more cameras 218 and one or more optical sensors 220. Other sensors that facilitate the alignment process can also be included. For example, the cameras 218 can be the set of cameras 122,124 of FIG. 1 and the optical sensors 220 can be the set of front wheel sensors 114, 116 and the set of rear wheel sensors 118, 120 of FIG. 1. The processor 202 processes data signals and performs general computing and arithmetic functions. Particularly, the processor 202 is configured to transmit, receive and process data signals from the memory 206, the I/O interface 208, the disk 210, the alignment sensors 214 and the vehicle systems 212.

In some embodiments, one or more of the components in the computer system 200 may be combined, omitted or organized into different architectures. For example, the memory 206 may be included with the processor 202 and so forth. Additionally, it is to be appreciated that other components not shown in FIG. 2 can be included (e.g., communication units/gateways, network buses, other vehicle systems (e.g., vehicle systems 212), etc.).

In the illustrated embodiment, the processor 202 includes a wheel alignment module 222, a radar position determination module 224, a beam transmission module 226 and a guidance module 228, which process data and execute functions as described in further detail herein. Generally, the processor 202 can be a variety of various processors including dual microprocessor and other multi-processor architectures. The memory 206 stores instructions and/or data executed and/or processed by the processor 202. The memory 206 can include volatile memory and/or non-volatile memory, for example, Read Only Memory (ROM) and Random Access Memory (RAM).

The I/O interface 208 represents hardware and software providing input to the computer system 200 and providing output from the computer system 200. For example, input can be received though a cursor controller, a mouse, a keyboard, a touch screen and other mechanisms adapted to communicate information or commands to the processor 202 or the memory 206 through the computer system 200. Output can be provided to devices such as a computer screen, a monitor, a touch screen, a navigation display, a portable device screen (e.g., mobile phone, laptop), any other similarly equipped display devices, among others. The I/O interface 208 also facilitates communication between the processor 202, other components of the computer system 200, the alignment sensors 214, the vehicle systems 212 and other networks (e.g., the Internet, Wide Local Area Networks (WLAN) (not shown)). Communication can be enabled via wired, wireless or telecommunication protocol technologies known in the art. For example, communication can include a network transfer, a file transfer, an applet transfer, an email, an HTTP transfer, and so on. Communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, among others.

The disk 210 includes one or more disk drives for storing data and instructions for use by the processor 202. The disk 210 can include, but is not limited to, devices like a magnetic disk drive, a solid state disk drive, a floppy disk drive, a tape drive, a Zip drive, a flash memory card, and/or a memory stick. Furthermore, the disk 210 can include optical drives like a CD-ROM, a CD recordable drive (CD-R drive), a CD rewriteable drive (CD-RW drive), and/or a digital video ROM drive (DVD ROM). The disk 210 could also include a logical entity for storing data, for example, a database, a table, a file, a list, a queue, a heap, a register, among others.

Figure 3:
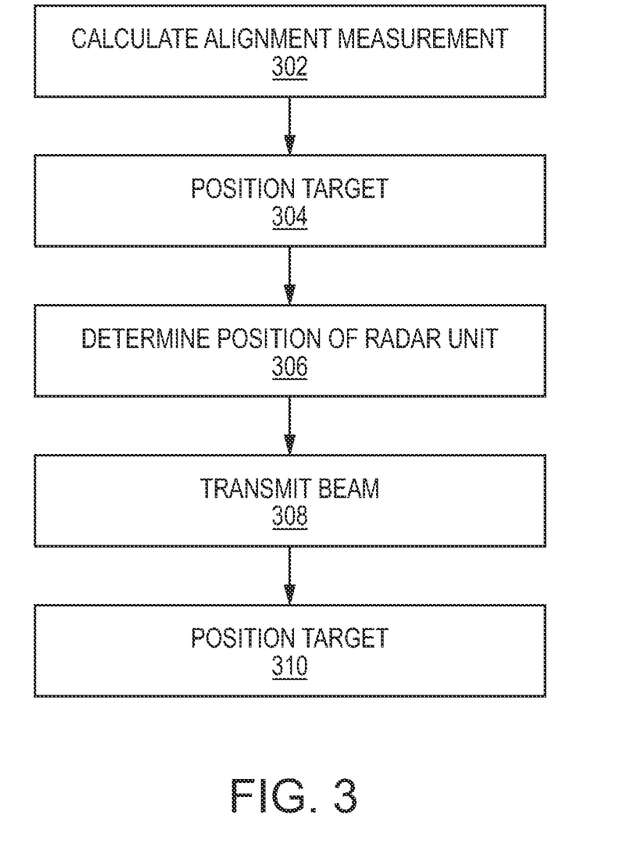
FIG. 3 is a process flow diagram of a method for aligning sensors of a radar unit mounted on a vehicle.
Figure 4:
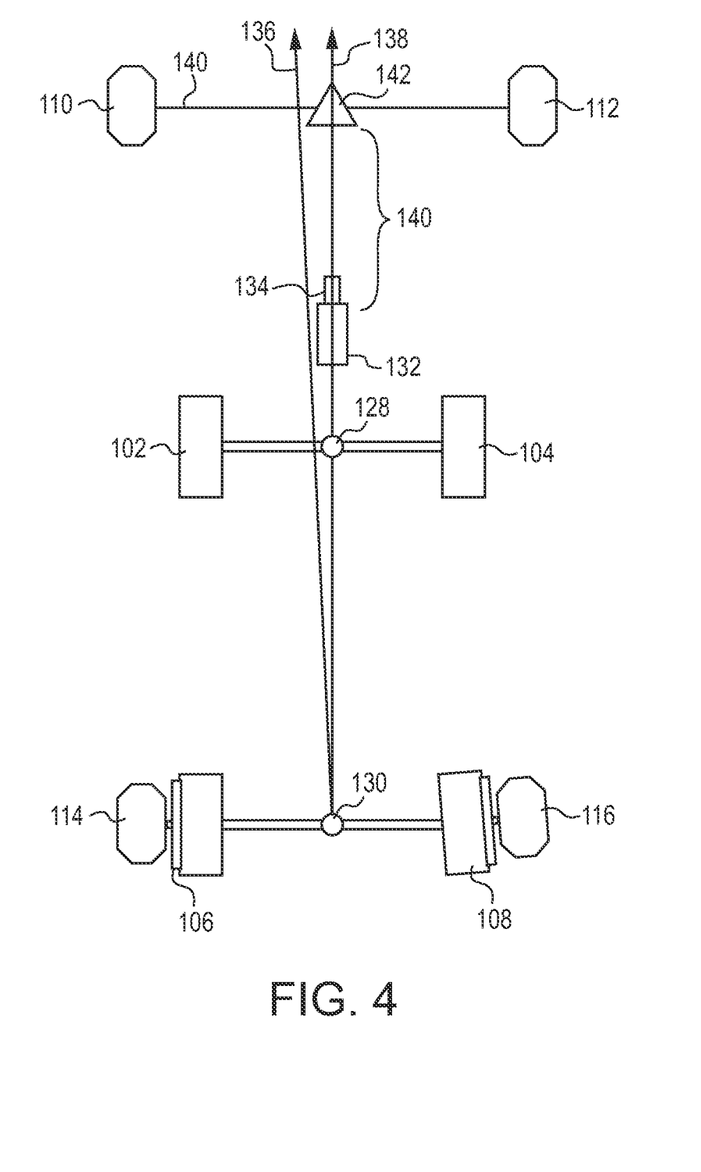
FIG. 4 is a simplified illustration of FIG. 1 with a detailed view of a radar alignment system according to an exemplary embodiment.
Figure 5:
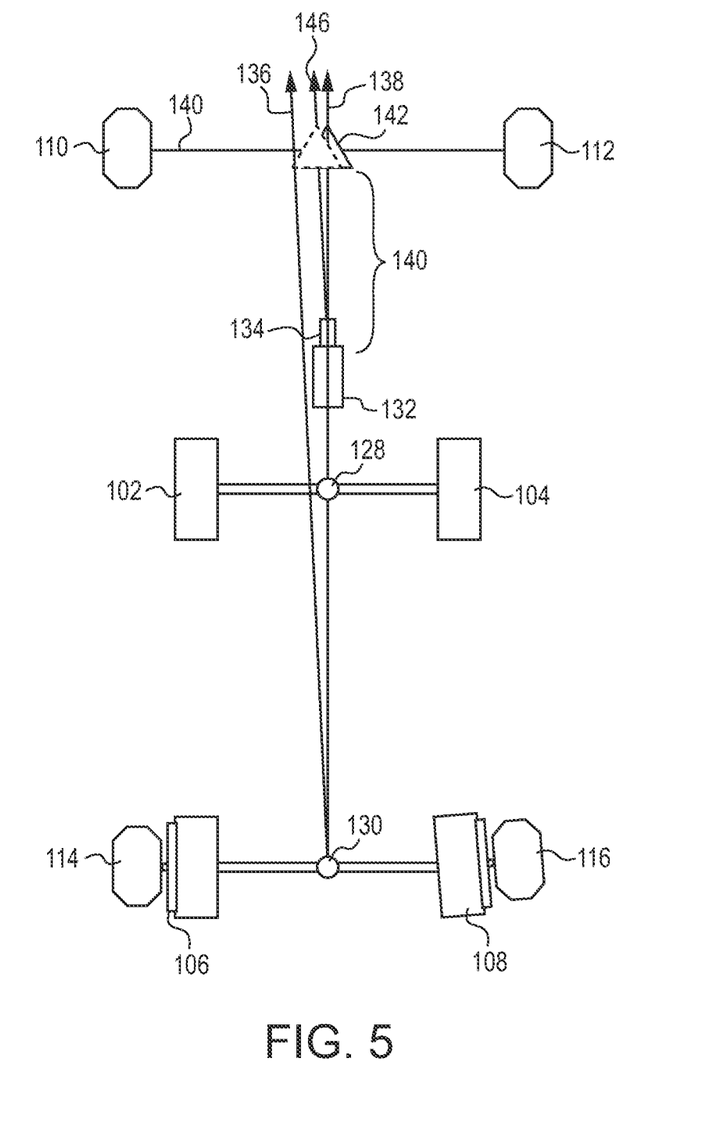
FIG. 5 is a simplified illustration of FIG. 1 with a detailed view of a radar alignment system including a radar centerline aligned with a target according to an exemplary embodiment.

With reference to FIG. 3, a computer implemented method is shown for aligning a sensor of a radar unit mounted on a vehicle. In particular, the method will be described in association with the computer system 200 and radar alignment system 100, though it is to be appreciated that the method could be used with other systems. Additionally, FIGS. 4-5 illustrate simplified views of the radar alignment system 100 and will be used to describe the method of FIG. 3. For simplicity, the body of the motor vehicle 101 and the vehicle service bay 112 is not shown in FIGS. 4-5. However, the set of front wheels 102, 104, the set of rear wheels 106, 108, the set of front wheel sensors 114, 116 and the set of rear wheel sensors 118, 120 are illustrated. Additionally, a center of a front wheel axle 128 (i.e., located between the set of front wheels 102, 104), a center of a rear wheel axle 130 (i.e., located between the set of rear wheels 106, 108), and a radar unit 132 of the motor vehicle 101 are illustrated. The radar unit 132 includes a radar sensor 134 and can be a radar unit associated with an intelligent vehicle system, for example, one of the plurality of vehicle systems 212 of FIG. 2.

At step 302, the method includes calculating at least one alignment measurement from a plurality of optical sensors of an alignment system. The alignment measurements can be received and calculated using a standard wheel alignment process known in the art. In one embodiment, the computer system 200 calculates at least one alignment measurement of the motor vehicle 101. Specifically, the wheel alignment module 224 of the processor 202 acquires vehicle data transmitted from the plurality of alignment sensors 214 to calculate at least one alignment measurement. The plurality of alignment sensors 214 can be optical sensors 220, for example, in FIG. 1, the set of front wheel sensors 114, 116 and the set of rear wheel sensors 118, 120. The plurality of alignment sensors 214 can also be cameras 218, for example, the set of cameras 122, 124 of FIG. 1 or other sensors. The wheel alignment module 224 can store the calculated alignment measurements in the disk 210.

The alignment measurements can include a vehicle thrust line and a vehicle centerline (e.g., vehicle thrust line 136 and vehicle centerline 138). The vehicle thrust line is a line projected from the center of the rear wheel axle. The vehicle thrust line determines the travel path of the vehicle. Referring again to FIGS. 4-5, the illustrated vehicle thrust line 136 is projected from the center of the rear wheel axle 130. The vehicle centerline is a line projected through the centerline of a vehicle from the center of the rear wheel axis and through the center of the front wheel axis. For example, in FIGS. 4-5, the illustrated vehicle centerline 138 is projected from the center of the rear wheel axle 130 through the center of the front wheel axle 128.

At step 304, the method includes positioning a target 142 a predetermined distance 140 forward of the radar unit 132 mounted on the motor vehicle 101. The radar unit 132 is mounted at the front of the motor vehicle 101 and includes the radar sensor 134. The radar sensor 134 can be any type of sensor known in the art, for example, a digital camera, an image sensor, a laser sensor among others. In particular, the sensor radar sensor 134 is a radar or laser sensor used by an intelligent vehicle system, for example, a CMBS, a BSI, an LKAS for detecting other vehicles, objects and pedestrians in a region surrounding the motor vehicle 101. For example, the radar sensor 134 can be one of a radar sensor 216 of one of a vehicle system 212 of FIG. 2.

The target 142 can be any type of optical or reflective target used for aiming the radar sensor 134. In one embodiment, the target 142 is positioned by an operator at a predetermine distance 140 forward of the radar unit 132 mounted on the motor vehicle 101. Positioning the target 142 may further include positioning at least one optical sensor laterally spaced apart from the target. For example, the set of front wheel sensors 114, 116 can be moved from the set of front wheels 102, 104 to a location laterally spaced apart from the target 142. In another embodiment, the target 142 and at a least one other optical sensor (e.g., the set of front wheel sensors 114, 116) is positioned forward and parallel to the front of the motor vehicle 101. The target 142 and the other optical sensor can be positioned at a predetermine distance 140 forward of the front of the motor vehicle 101.

In still another embodiment, an aiming jig 140 is configured to support the target 142. The aiming jig 140 is positioned at a predetermined distance 140 forward of the radar unit 132 and parallel to a front of the motor vehicle 101. The aiming jig 140 may also be configured to support other optical sensors. For example, the set of front wheel sensors 114, 116 may be moved from the set of front wheels 102, 104 of the motor vehicle 101 to the aiming jig 136.

The predetermined distance 140 of the target 142 can be five meters forward of the radar unit 132. In another embodiment the predetermined distance 140 of the target 142 is one meter forward of the radar unit 132. It is to be appreciated the distance 140 can be predetermined by the computer system 200 and may be distances other than the exemplary distances described and illustrated herein. The computer system 200 can store the predetermined distance 140 in the disk 210 and display the predetermined distance 140 on a screen via the I/O interface 208. In another embodiment, the computer system 200 detects the predetermined distance 140 of the target 142 in relation to the radar unit 132 using one or more of the plurality of alignment sensors 214. In a further embodiment, the computer system 200 receives the predetermined distance 140 of the target 142 via an input operation, for example, an operator entering the distance into the computer system 200 via an input operation (e.g., a keyboard communicatively coupled to the I/O interface 208). Further, the predetermined distance 140 can be retrieved via the I/O interface 208 from an external network (not shown).

At step 306, the method includes determining a position of the radar unit 132 based on the alignment measurement and the predetermined distance 140 of the target 142. More specifically, the position can be based on the vehicle thrust line 136 or the centerline 134 and the predetermined distance 140. In another embodiment, the radar position determination module 224 of the computer system 200 determines a position of the radar unit 132 based on the alignment measurement and the predetermined distance 140 of the target. The computer system 200 may store the position of the radar unit 132 in the disk 210.

At step 308, the method includes transmitting a beam extending forward from the radar unit 132. Referring to FIG. 5, the beam is a radar centerline 146 extending forward from the radar unit 132. The position of the beam can be determined based on the vehicle thrust line 136, the vehicle centerline 138 and the position of the radar unit 132. The position can be parallel to the vehicle thrust line 136. In one embodiment, the beam transmission module 226 of the computer system 200 transmits the beam (i.e., the radar centerline 146) and determines the position of the beam.

In another embodiment, the method includes emitting a beam from the radar unit 132 extending towards the target 142 and calculating the radar centerline 146 extending from the radar unit 132 towards the target 142. The radar centerline 146 is calculated so that a first angle (i.e., angle A1 of FIG. 6) between the radar centerline 146 and the vehicle thrust line 136 is equal to a second angle (i.e., angle A2 of FIG. 6) between the radar centerline 146 and the vehicle centerline 138. The beam is then emitted along the radar centerline 146.

Figure 6:
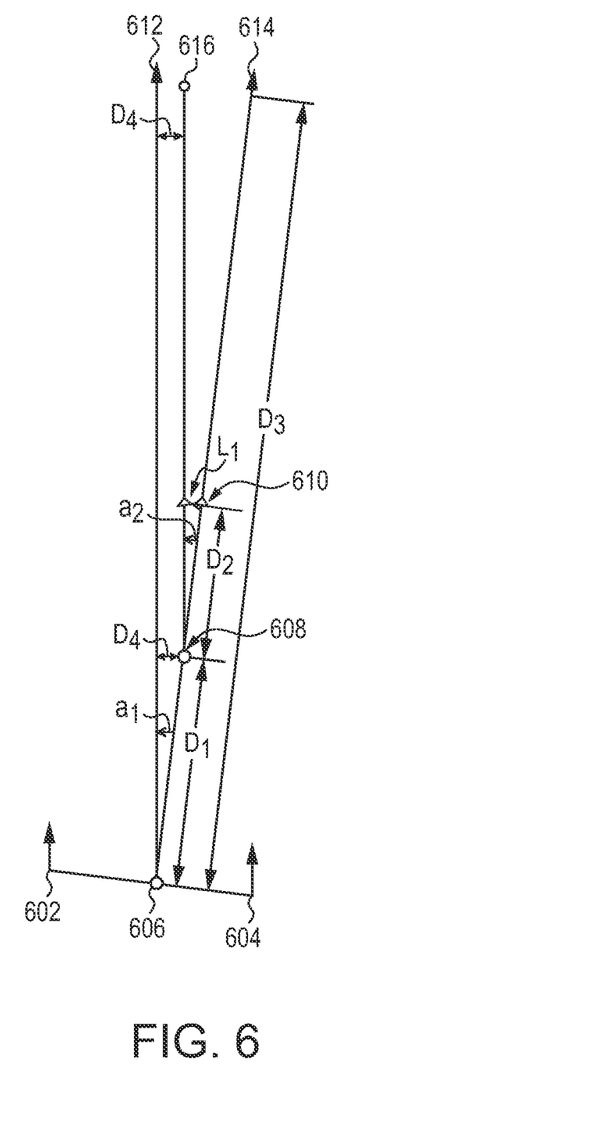
FIG. 6 is a schematic view of alignment measurements according to an exemplary embodiment.

Referring now to FIG. 6, a schematic view of alignment measurements that can be used to determine the position of the radar unit 132 and the radar centerline 146 are illustrated according to the method of FIG. 3. The alignment measurements are distances and angles determined in relation to the vehicle components. Particularly, the alignment measurements can be calculated by the processor 202 for radar alignment as described in the method of FIG. 3. The components described herein with regards to FIG. 6 can be the same or similar to the like-named components of FIGS. 1 and 4-5. FIG. 6 includes a set of rear wheels 602, 604, a center of a rear wheel axle 606, and a radar unit 608, for example, as part of a motor vehicle 101. FIG. 6 also includes a target 610 positioned forward of the radar unit 608, a vehicle thrust line 612, a vehicle centerline 614 and a radar centerline 616. Distance D1 is a distance between the center of the rear wheel axle 606 and the radar unit 608. Distance D2 is the distance between the radar unit 608 and the target 610. An angle A1 is the thrust angle between the vehicle centerline 614 and the vehicle thrust line 612. L1 is the arc length of the thrust angle A1. An angle A2 is the angle between the vehicle centerline 614 and the radar centerline 616. Distance D4 is the distance between the radar centerline 616 and the vehicle thrust line 612. The position of the radar centerline 616 can be determined based on the vehicle thrust line 612, the vehicle centerline 614 and the distances D1 and D2. Alternatively, the position of the radar centerline 616 can be determined so that the angle A1 equals the angle A2. It is to be appreciated that the alignment measurements described herein can be used alone or in combination to determine the position of the radar unit 608 and/or the position of the radar centerline 616. For example, in one embodiment, distances D1 and D2 of the vehicle centerline 614 are used to determine the position of the radar unit 608.

At step 310, the method includes positioning the target and the sensor in alignment with the axis of the beam. Referring again to FIG. 5, the target 142 has been re-positioned in alignment with the axis of the radar centerline 146. The radar sensor 134 of the radar unit 132 can then be aligned with the axis of the beam (i.e., the radar centerline 146) as known in the art, for example, by aiming the radar sensor 134 at the target 142. The guidance module 228 of the computer system 200 can be configured to guide the placement of the target 142 and the radar sensor 134 in alignment with the axis of the beam (i.e., the radar centerline 146). For example, the guidance module 228 can output visual or audio instructions to guide an operator to move the target and complete the aiming process.

It will be appreciated that various modifications of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer implemented method for aligning a sensor of a radar unit mounted on a vehicle, comprising:
   calculating at least one alignment measurement from a plurality of optical sensors of an alignment system;
   positioning a target at a predetermined distance forward of the radar unit;
   determining a position of the radar unit based on the alignment measurement and the predetermined distance of the target;
   transmitting a beam extending forward from the radar unit; and
   positioning the target and the sensor in alignment with an axis of the beam.

2. The computer implemented method of claim 1, wherein the predetermined distance is five meters forward of the radar unit.

3. The computer implemented method of claim 1, wherein at least one alignment measurement includes a vehicle centerline and a vehicle thrust line.

4. The computer implemented method of claim 3, further including determining a position of the beam based on the vehicle centerline, the vehicle thrust line and the position of the radar unit.

5. The computer implemented method of claim 4, wherein the position is parallel to the vehicle thrust line.

6. The computer implemented method of claim 1, wherein positioning the target at the predetermined distance further includes positioning at least one optical sensor laterally spaced apart from the target.

7. The computer implemented method of claim 1, wherein calculating at least one alignment measurement further includes performing a vehicle wheel alignment thereby acquiring said alignment measurement.

8. A computer implemented method for radar alignment on a vehicle, comprising:
    positioning a target and at least one optical sensor forward and parallel to a front of the vehicle at a predetermined distance forward of a radar unit;
    calculating a position of the radar unit mounted on the vehicle based on a distance between the target and the radar unit and at least one alignment measurement;
    emitting a beam from the radar unit extending towards the target;
    positioning the target in alignment with an axis of the beam; and
    aiming a sensor of the radar unit towards the target.

9. The computer implemented method of claim 8, wherein at least one alignment measurement includes a vehicle centerline and a vehicle thrust line.

10. The computer implemented method of claim 9, further including calculating a radar centerline extending from the radar unit towards the target, wherein a first angle between the radar centerline and the vehicle thrust line is equal to a second angle between the vehicle centerline and the vehicle thrust line.

11. The computer implemented method of claim 10, wherein emitting the beam further includes emitting the beam along the radar centerline.

12. A computer system for aligning a sensor of a radar unit mounted on a vehicle, comprising:
    a wheel alignment module configured to calculate at least one alignment measurement of the vehicle;
    a radar position determining module configured to determine a position of the radar unit based on the alignment measurement and a predetermined distance of a target, said target located forward of the radar unit;
    a beam transmission module configured to transmit a beam extending forward from the radar unit; and
    a guidance module configured to guide the placement of the target and the sensor in alignment with the axis of the beam.

13. The computer system of claim 12, further including an input/output module for acquiring the predetermined distance of the target.

14. The computer system of claim 12, further including an aiming jig located forward and parallel to a front of the vehicle.

15. The computer system of claim 14, wherein the aiming jig includes the target and at least one optical sensor.

16. The computer system of claim 12, wherein at least one alignment measurement includes a vehicle centerline and a vehicle thrust line.

17. The computer system claim 16, wherein the beam transmission module is further configured to calculate a position of the beam based on the vehicle centerline, the vehicle thrust line and the position of the radar unit.

18. The computer system of claim 17, wherein the position is parallel to the vehicle thrust line.

19. The computer system of claim 16, wherein the radar position determining module is configured to calculate a radar centerline extending from the radar unit towards the target, wherein the radar centerline is based on the vehicle thrust line, the vehicle centerline, a distance between a center of a rear wheel axle and the radar unit and a distance between the radar unit and the target, and the beam transmission module transmits the beam along the radar centerline.

20. The computer system of claim 12, wherein the predetermined distance is at least one meter forward of the radar unit.

21. A computer implemented method for aligning a sensor of a radar unit mounted on a vehicle, comprising:
    calculating at least one alignment measurement from a plurality of optical sensors of an alignment system;
    positioning a target at a predetermined distance forward of the radar unit;
    determining a position of the radar unit based on the alignment measurement and the predetermined distance of the target;
    calculating a radar centerline extending from the radar unit towards the target, wherein a first angle between a radar centerline and a vehicle thrust line is equal to a second angle between the vehicle centerline and a vehicle thrust line;
    transmitting a beam extending forward from the radar unit; and
    positioning the target and the sensor in alignment with an axis of the beam.

22. The computer implemented method of claim 21, wherein transmitting the beam includes emitting the beam along the radar centerline.

23. A computer implemented method for radar alignment on a vehicle, comprising:
    positioning a target at a predetermined distance forward of a radar unit mounted on the vehicle and at least one optical sensor forward and parallel to a front of the vehicle;
    calculating a position of the radar unit based on a distance between the target and the radar unit and at least one alignment measurement;
    calculating a radar centerline extending from the radar unit towards the target, wherein a first angle between the radar centerline and a vehicle thrust line is equal to a second angle between a vehicle centerline and the vehicle thrust line;
    emitting a beam from the radar unit extending towards the target;
    positioning the target in alignment with an axis of the beam; and
    aiming a sensor of the radar unit towards the target.

24. The computer implemented method of claim 23, wherein emitting the beam further includes transmitting the beam along the radar centerline.

25. A computer system for aligning a sensor of a radar unit mounted on a vehicle, comprising:
    a wheel alignment module configured to calculate at least one alignment measurement of the vehicle;
    a radar position determining module configured to determine a position of the radar unit based on the alignment measurement and a predetermined distance of a target, said target located forward of the radar unit;

a radar centerline determining module, calculating a radar centerline extending from the radar unit towards the target, wherein a first angle between the radar centerline and a vehicle thrust line is equal to a second angle between a vehicle centerline and the vehicle thrust line;

a beam transmission module configured to transmit a beam extending forward from the radar unit; and a guidance module configured to guide the placement of the target and the sensor in alignment with the axis of the beam.

26. The computer system of claim 25, wherein transmitting the beam includes emitting the beam along the radar centerline.

* * * * *